US011232223B2

(12) United States Patent
Chasman et al.

(10) Patent No.: US 11,232,223 B2
(45) Date of Patent: Jan. 25, 2022

(54) PROVIDING WEB APPLICATION COMPONENTS WITHIN REMOTE SYSTEMS

(71) Applicant: salesforce.com, inc., San Francisco, CA (US)

(72) Inventors: Doug Chasman, Pittsford, NY (US); Jeffrey Lloyd Sauls, Jr., San Rafael, CA (US)

(73) Assignee: salesforce.com, inc., San Francisco, CA (US)

( * ) Notice: Subject to any disclaimer, the term of this patent is extended or adjusted under 35 U.S.C. 154(b) by 1207 days.

(21) Appl. No.: 15/264,091

(22) Filed: Sep. 13, 2016

(65) Prior Publication Data

US 2018/0075250 A1     Mar. 15, 2018

(51) Int. Cl.
| | |
|---|---|
| *G06F 21/62* | (2013.01) |
| *G06F 21/31* | (2013.01) |
| *G06F 16/958* | (2019.01) |
| *H04L 29/08* | (2006.01) |
| *H04L 29/06* | (2006.01) |

(52) U.S. Cl.
CPC ........ *G06F 21/6227* (2013.01); *G06F 16/958* (2019.01); *G06F 16/986* (2019.01); *G06F 21/31* (2013.01); *H04L 63/083* (2013.01); *H04L 63/101* (2013.01); *H04L 67/1097* (2013.01)

(58) Field of Classification Search
CPC .... G06F 21/6227; G06F 21/31; G06F 16/986; G06F 16/958; G06F 21/62; H04L 67/1097; H04L 63/101; H04L 63/083; H04L 29/08
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |

(Continued)

OTHER PUBLICATIONS

Dong et al. ("Similarity Search for Web Services", Proceedings of the 30 VLDB Conference, Toronto, Canada, 2004) (Year: 2004).*

(Continued)

*Primary Examiner* — Ken Hoang
(74) *Attorney, Agent, or Firm* — Weaver Austin Villeneuve & Sampson LLP

(57) ABSTRACT

Disclosed are examples of systems, apparatus, methods and computer program products for providing components for building web applications within remote systems. A component database for web application components and an application database for web applications can be maintained in a multi-tenant database system. A first request can be processed to provide a web application for use at a remote site associated with a developer. Authorization of the remote site by the multi-tenant database can be determined based on a list of allowed remote sites for web applications. Data associated with the web application can then be sent to the remote site. A second request can be processed to provide a component for use at the remote site, indicating a component location of the remote site. Data associated with the first component can then be sent to the remote site. The data can be capable of causing an instance of the first component to be included at the component location of the remote site.

20 Claims, 10 Drawing Sheets

(56) References Cited

U.S. PATENT DOCUMENTS

| | | |
|---|---|---|
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,392,510 B1 * | 6/2008 | Treder .................. G06F 16/958 717/128 |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,566,792 B2 | 10/2013 | Chasman et al. |
| 8,646,103 B2 | 2/2014 | Jakobson et al. |
| 8,875,242 B2 * | 10/2014 | Choi ..................... H04L 63/10 726/4 |
| 8,914,438 B2 | 12/2014 | Pletter et al. |
| 9,021,435 B2 | 4/2015 | Pletter et al. |
| 9,098,618 B2 | 8/2015 | Chasman et al. |
| 9,426,249 B2 | 8/2016 | Chasman et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |

(56) References Cited

U.S. PATENT DOCUMENTS

| | | |
|---|---|---|
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2011/0289140 A1 | 11/2011 | Pletter et al. |
| 2011/0289141 A1 | 11/2011 | Pletter et al. |
| 2011/0289425 A1 | 11/2011 | Pletter et al. |
| 2012/0042218 A1 | 2/2012 | Cinarkaya et al. |
| 2012/0191971 A1* | 7/2012 | Battistello ............... H04L 9/083 |
| | | 713/155 |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0039999 A1* | 2/2015 | Chasman ................ H04L 67/10 |
| | | 715/234 |
| 2015/0095162 A1 | 4/2015 | Jakobson et al. |
| 2015/0142596 A1 | 5/2015 | Jakobson et al. |
| 2015/0143223 A1* | 5/2015 | Kolam ................ G06F 17/2247 |
| | | 715/234 |
| 2015/0172563 A1 | 6/2015 | Jakobson et al. |
| 2015/0199080 A1 | 7/2015 | Pletter et al. |

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

* cited by examiner

```
<script src="https://gs0.lightning.force.com/lightning/lightning/lightning.out.js"></script>
```
410

```
$Lightning.use("ltngx:iotest", function() {}, oauth.instance_url, oauth.access_token);
```
420

```
$Lightning.createComponent("ltngx:chatter", {}, "chatterFeed", function(cmp) {});
```
430

PROVIDING WEB APPLICATION COMPONENTS WITHIN REMOTE SYSTEMS

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to cloud computing services provided over a data network such as the Internet, and more specifically to providing components for building web applications within remote systems.

BACKGROUND

"Cloud computing" services provide shared resources, applications, and information to computers and other devices upon request. In cloud computing environments, services can be provided by one or more servers accessible over the Internet rather than installing software locally on in-house computer systems. As such, users having a variety of roles can interact with cloud computing services. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF DESCRIPTION OF THE DRAWINGS

The included drawings are for illustrative purposes and serve only to provide examples of possible structures and operations for the disclosed inventive systems, apparatus, methods and computer program products for providing components for building web applications within remote systems. These drawings in no way limit any changes in form and detail that may be made by one skilled in the art without departing from the spirit and scope of the disclosed implementations.

FIG. 4 shows an example of three lines of code 400 that can be served at a remote site to provide a web application and component from an external multi-tenant database system, according to some implementations.

DETAILED DESCRIPTION

Figure 1:
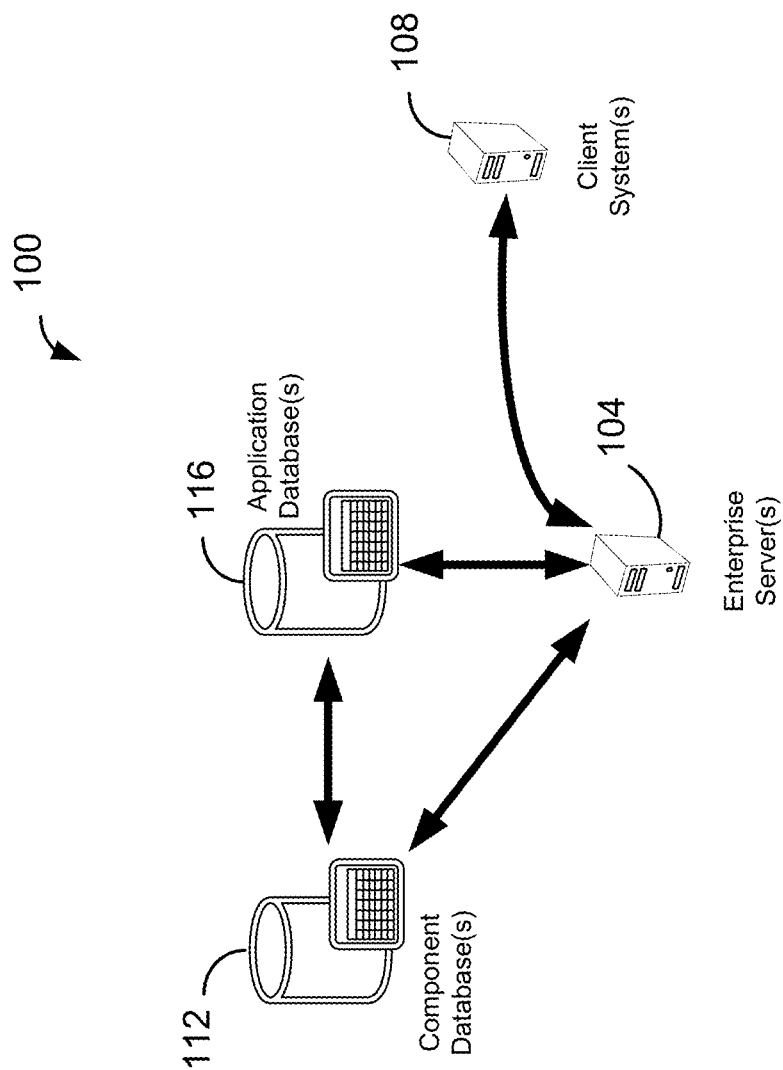
FIG. 1 shows a system diagram of an example of a system 100 for providing a web application framework with components for remote sites, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured for providing components for building web applications within remote systems.

Web application frameworks enable web developers to develop dynamic websites, web applications, and web services. Web application frameworks are used in part to alleviate the overhead associated with common activities performed in web development. They may provide libraries for database access, templates, and session management, and may also provide levels of code reuse for more efficient web application development. These web application frameworks have traditionally focused on allowing users to build web applications on the level of pages, and then deploying those applications as pages. Traditional web application frameworks may allow developers to present events and activities that run within a single page application, such as a single HTML page that is loaded and dynamically updated as the user interacts with the application. Such frameworks will typically control the page by updating and modifying the page's Document Object Model ("DOM") as needed.

Recently, there have been efforts from web application frameworks to move away from the single page application, toward a framework focused on web application components ("components"). Components are small, reusable elements that can combine and interrelate to comprise a larger application. Components are highly encapsulated, provide modular functionality, and ideally require no assumptions about the web containers or pages they run in. Component-centric applications, rather than page-centric applications, are becoming a popular way to provide similar user experiences across a wide variety of devices, with little or no extra effort for any one platform or device.

Multiple components from external sources would typically require iFrames for each component, either involving separate cross-domain requests for each iFrame and component, or iFrames that are designated to reside on the same domain as the parent window. For an application with many components and cross-domain requests, the result is often slow to load, inefficient, and processor-intensive. Alternatively, when iFrames are designated to reside on the same domain, there is a potential security risk. This is because any content from the same domain is allowed to access the parent DOM, resulting in potential attacks such as executing JavaScript in the host document. Thus, even if a web application framework is component-centric, if it still controls the page such that all components reside on the same domain, then there are possible vulnerabilities.

By way of illustration, Jane is in charge of developing a financial application for a clothing reseller, Athleisure. She wants to incorporate a customized chat feed into the application that is developed and hosted on an external database system at domain B. When deciding how to embed the external chat feed components within her existing application on Athleisure's content management system, she first tries iFrames that serve as containers for the components. She implements the application such that the chat feed is served from domain B in a special frame, while other components of her application are served from domain A. The chat feed iFrame requires multiple requests to the database system to manage the various actions, resources, and updates between the component instances and the database system in domain B. Every iFrame request is another request to domain B, which adds up to many requests. Jane finds that these many requests are manageable on a modern computer, but on a mobile device, the multiple simultaneous requests slow down the application considerably. Jane considers implementing a version of the chat feed directly on Athleisure's server, using Application Programming Interfaces ("API"s) that provide the chat feed functionality. However, the chat feed application has multiple objects and APIs, and such an implementation would take considerable effort and resources. In addition, while many developers try to use public APIs for create, read, update, and delete operations on objects, it is often not possible when tools and applications must make calls via server-side technologies that are not exposed in the public APIs. Such developers may use private APIs for such calls, not the public APIs available to Jane such as public representational state transfer (REST) APIs. Thus, recreating the chat feed may in fact be impossible in such an instance.

Some of the disclosed techniques can be implemented to provide a framework from web applications where components can be provisioned from a database system to remote systems with drastically reduced need for each component to send cross-domain requests. Upon a page being served, the browser verifies authentication with the database system, and an access token is passed to the browser. Cross-Origin Resource Sharing (CORS) is then utilized by the browser on the client machine to determine if the page domain has been allowed by the database system to receive data from the database system domain. If the page has been allowed in the database system's COR whitelist, then the browser verifies that a connection between valid, trusted sources can be established. A specific rendering of an application and its resources and scripts is requested and received by the browser, containing all components and instructions necessary to run the application on the client machine. The remote site can then make calls to the database system as needed using the access token. In this way, rather than multiple cross-domain requests being sent from multiple iFrames, a web application with its component data, resources, and scripts can be received at once and accessed on the client side. Components can then handle events of other components and otherwise interrelate with each other, allowing for fast, dynamic web applications.

Applying some implementations of the disclosed techniques, an alternative scenario to that described above is provided. In this alternative scenario, rather than using iFrames or an API implementation, Jane embeds a chat feed application into the Athleisure financial application using a few lines of scripted instructions read by the browser. From the browser, a JavaScript file is received from the database server. Using an authentication system such as OAuth, the browser authenticates the database system. The database system instructs the browser to check a CORS whitelist to determine whether Athleisure's domain is allowed to interoperate with the database system domain. If so, then a connection is established between the two domains, and resources can be shared. Jane's lines of instructions request the chat feed application resources and instructions, and the database system returns these resources and instructions. Jane's instructions also request one or more components to be created, and the database system returns instances of the requested chat feed components. The chat feed then runs in the browser in a client-centric way, using the application resources and instructions that were received. Jane's instructions may make additional requests and calls to the database system to receive data the application needs. The application with embedded chat feed runs smoothly for users within the browser, without needing many simultaneous requests, whether on a desktop computer or a mobile device. Thus, Jane and Athleisure are happy with a fast, efficient, client-centric, component-centric application that can utilize components from external database systems.

In some but not all implementations, the disclosed methods, apparatus, systems, and computer-readable storage media may be configured or designed for use in a multi-tenant database environment.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

FIG. 1 shows a system diagram of an example of a system 100 for providing a web application framework with components for remote sites, in accordance with some implementations. System 100 includes a variety of different hardware and/or software components which are in communication with each other. In the non-limiting example of FIG. 1, system 100 includes at least one enterprise server 104, at least one component database 112, and at least one application database 116.

Component database 112 can store and maintain web application component data. A component may be any self-contained and reusable unit that may be included or deployed in a web application or user interface, such as a button, a text field, or a list. A component may be used in any web application UI that includes the component. In some implementations, a component has an API that instructs a developer that wants to include the component in his application how to use the component. Having a clear API allows the internal implementation details of the component to be opaque to a user of the component. It also allows a component author to change the internal implementation details of the component without affecting the users of the component. In some implementations, a component has a component version identifier indicating the current version of the component. In some implementations, each component is associated with a developer identifier number in the component database 112.

In some implementations, components stored in the component database 112 may be custom components that have been created by one or more developers or users within the multi-tenant database system. Custom components may be included in the database with restricted access for the developer who designed them, or access may be given to one or more additional developers, up to and including global access to any developer in the multi-tenant database system. In some implementations, since components are self-contained and reusable within many different applications, their functionality is not dependent upon or tied to any one web application. Instead, they may be included in one or more web applications based on whether a developer has the need for that particular component.

Application database 116 can store and maintain web application data. A web application is any application that may be deployed in a browser. Web applications may include one or more components. In a web application with multiple components, the components may be designed to be self-contained, but may nonetheless interact with other components within the application. For example, an application may include a component that fires off events based on different conditions, and another component that handles or listens for events, and performs some action when events are registered. The two components need not be aware of the other's functionality, but they may still work together within the context of an application. Applications may be created by developers or users of the multi-tenant database system. In some implementations, a developer identifier number is associated with each application in the application database 116.

Enterprise server 104 may communicate with other components of system 100. This communication may be facilitated through a combination of networks and interfaces. Enterprise server 104 may handle and process data requests from the client system 108. Likewise, enterprise server 104 may return a response to client system 108 after a data request has been processed. For example, enterprise server 104 may retrieve data from one or more databases, combine some or all of the data from different databases, and send the processed data to client system 108.

Client system 108 may be a computing device capable of communicating via one or more data networks with a server. Examples of client system 108 include a desktop computer or portable electronic device such as a smartphone, a tablet, a laptop, a wearable device such as Google Glass®, another optical head-mounted display (OHMD) device, a smart watch, etc. Client system 108 includes at least one browser in which applications may be deployed.

Figure 2:
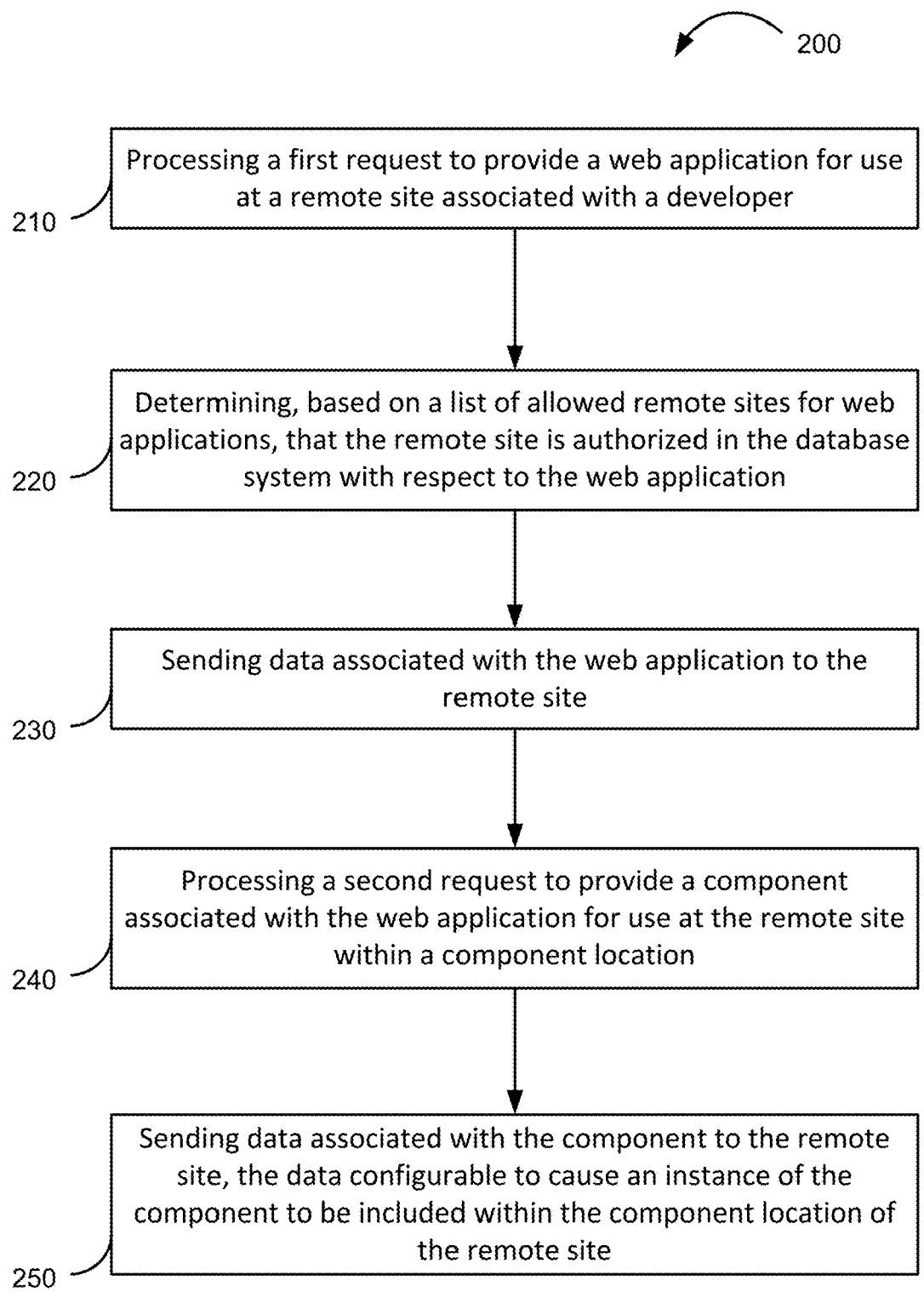
FIG. 2 shows a flowchart of an example of a method 200 for providing a web application framework with components for remote sites, performed in accordance with some implementations.

FIG. 2 shows a flowchart of an example of a method 200 for providing a web application framework with components for remote sites, performed in accordance with some implementations. Method 200 and other methods described herein may be implemented using system 100 of FIG. 1, although the implementations of such methods are not limited to system 100.

At block 210, the multi-tenant database system processes a first request to provide a web application for use at a remote site associated with a developer. A remote site is initiated on a browser at client system 108. The remote site is associated with a developer who has developed, or wishes to deploy, one or more web applications in the application database 116. For example, a browser at client system 108 may be pointed to a remote site located at /acme/index.html. The developer of the remote site has included an element from the multi-tenant database within the script or HTML of the remote site. For example, the developer may include a JavaScript element named lightning.out.js within the remote site with the following line: <script src="https://gs0.lightning.force.com/lightning/lightning.out.js"></script>.

In some implementations, a specific web application may be included by name in the request. In some implementations, including this element from the external site associated with the multi-tenant database triggers the browser at the client system 108 to seek authentication of the client system 108 as a valid, trusted source to make requests to the multi-tenant database system, and authentication of the multi-tenant database system as a valid, trust source to respond to requests and return data to the client system 108.

In some implementations, authentication may be performed using an authorization protocol, such as OAuth, SAML, or OpenID. An authorization protocol is a protocol that enables a user at a client system 108 to selectively decide which services can access the user's data. Server-to-server authentication can be performed using an authorization protocol. This authentication may include one or both of permitting access to client system 108 data by the multi-tenant database, and permitting access to multi-tenant database data by the client system 108. In some implementations, a remote site can register for authentication with respect to the multi-tenant database system. In some implementations, a prompt may appear at the browser of the client system 108. For example, a user at the browser may see the message: "XYZ will receive the following info: your public profile, friends, and public feed," followed by a prompt to select "Cancel" or "Okay." If the user selects "Okay," then the client system 108 is authenticated. In some implementations, an access token is generated by the multi-tenant database system and sent to the browser at client system 108. In some implementations, the access token includes a unique session identification number (session ID). This session ID may be used throughout the session to ensure constant authentication during requests between the client system 108 and the multi-tenant database.

Figure 6:
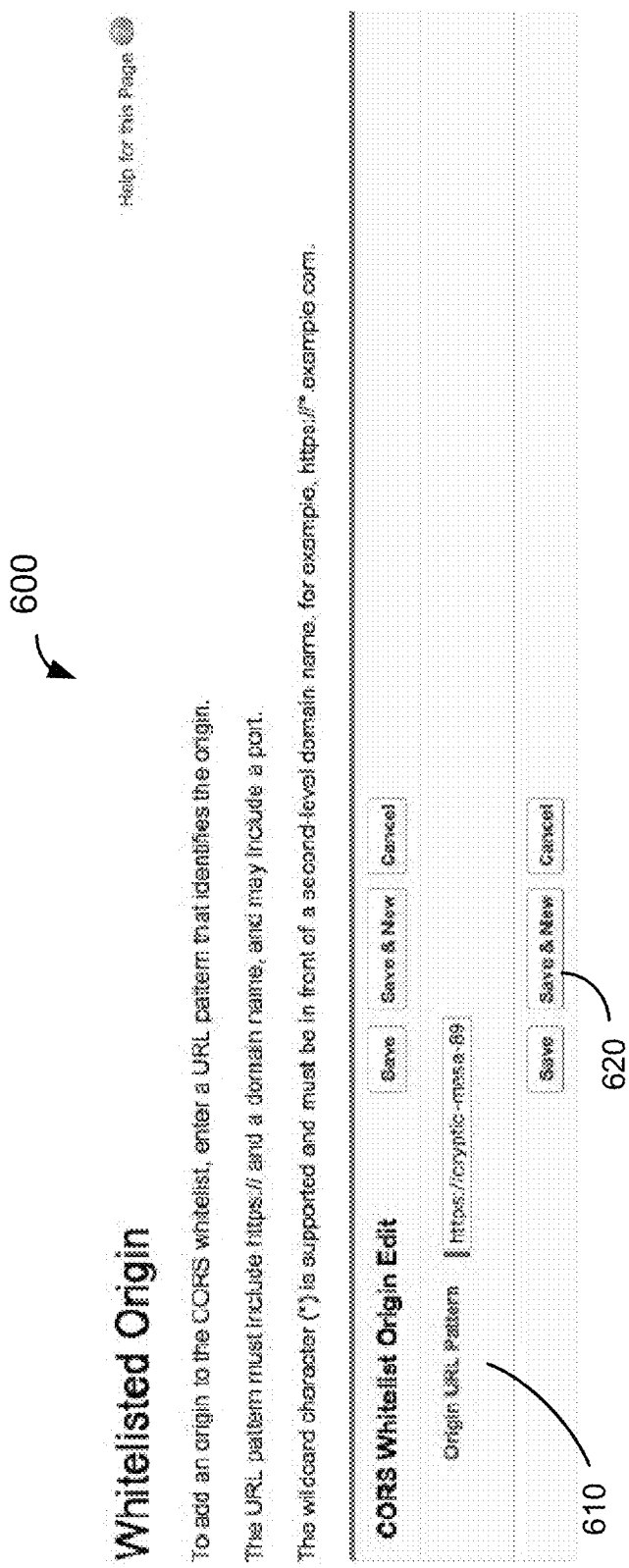
FIG. 6 shows an example screenshot of a user interface 600 allowing a developer to add a remote site to a Cross-Origin Resource Sharing (CORS) whitelist maintained at a multi-tenant database system, according to some implementations.

At block 220, the multi-tenant database system determines, based on a list of allowed remote sites for web applications, that the remote site is authorized in the database system with respect to the web application. In some implementations, the first request or an additional request from the remote site may have included a line requesting a web application. For example, the following line may have been sent to the multi-tenant database system: $Lightning.use ("ltngx:lotest", function( ) { }, oauth.instance_url, oauth.access_token). This line includes an application name, "lotest", as well as OAuth instance URL data and the access token with session ID. The browser at client system 108 sends this line on to the multi-tenant database system, and the multi-tenant database system initiates a determination of whether the remote site is authorized in the database system for "lotest", from a list of allowed remote sites for the "lotest" application stored in the multi-tenant database system. In some implementations, this determination is performed using Cross-Origin Resource Sharing (CORS). In some implementations, REST API calls may be utilized, either separately or in conjunction with CORS. CORS is a policy enforced by many modern browsers which allows, in certain circumstances, JavaScript loaded from one origin to access an API from another origin. For example, JavaScript loaded from /acme/index.html may request to access an API associated with "lotest" from the multi-tenant database. CORS instructs the browser to consult a CORS whitelist maintained by the multi-tenant database to determine whether the remote site is included for the web application. Developers and users in the multi-tenant database system can add their remote sites to the CORS whitelist. FIG. 6 is a user interface example illustrating a developer adding a remote site to a CORS whitelist maintained at a multi-tenant database system. The developer with a valid account at the multi-tenant database may add the remote site name to the "Origin URL Pattern" text field and click "Save" or "Save & New," and the remote site will be added to the CORS whitelist. Once the remote site has been added, then when that site requests an application API from the multi-tenant database, it will be recognized in the whitelist and authorization will be granted.

At block 230, the multi-tenant database system sends data associated with the web application to the remote site. In some implementations, web application data may include at least one of a list of API definitions, a list of resources, a list of components, JavaScript and other instruction documents, CSS and other markup documents, bootstrapping documents, or other data necessary to include the application within the remote site. For example, upon receiving a request for data related to the "lotest" application, a multi-tenant database may send to a remote site a list of API definitions related to the web application framework, as well as any data needed to run "lotest," including a list of resources, JavaScript, and CSS, in the correct order and sequence such that if it were injected into the remote site, the application would be ready to run on the client system 108.

At block 240, the multi-tenant database system processes a second request to provide a component associated with the web application for use at the remote site within a component location. In some implementations, a component name is sent to the multi-tenant database by the remote site, as well as a location for the component within a specified region of the remote site. In some implementations, the location may be uniquely identified by a locator ID. For example, a remote site may contain the line: $Lightning.createComponent ("ltngx:chatter", { }, "chatterFeed", function (cmp) { }). This line requests the multi-tenant database system to provided use a component associated with the web application for use in the remote site. Specifically, it requests an instance of a "chatter" component to be created, at the location within the remote site designated by the locator ID "chatterFeed." In some implementations, a DOM element may be designated instead of a locator ID, requesting an instance of the component to appear in the DOM as specified. In some implementations, authentication information, including the session ID, may be sent to the multi-tenant database to ensure that the session is authenticated.

At block 250, the multi-tenant database sends data associated with the requested component to the remote site. The data is configurable to cause an instance of the component to be included within the component location of the remote site, designated by the locator ID or DOM element. Since the necessary application data has been loaded, an instance of the component can be created at the remote site. The component can then run in the browser at the client system 108, in the designated location, following the API definitions and instructions received by the remote site. In some implementations, one or more additional requests can be sent by the remote site to the multi-tenant database, to retrieve some data that may be needed for a component. For example, social media updates stored within the multi-tenant database may be requested in order to populate the "chatter" component.

Block 240 and block 250 can repeat as needed for a single session, with multiple components being requested by the remote site, followed by data for those components being sent to the remote site for creating instances of the components on the remote site. Additional calls and requests may be made to the multi-tenant database as needed, but in some implementations, components and applications are designed to be client-centric, such that they are primarily run on the browser using the received application and component data, with minimum requests needing to be made to the multi-tenant database.

Thus, FIG. 2 illustrates an example method wherein web application components can be provided at a remote site by a multi-tenant database in a fast, efficient manner.

Figure 3:
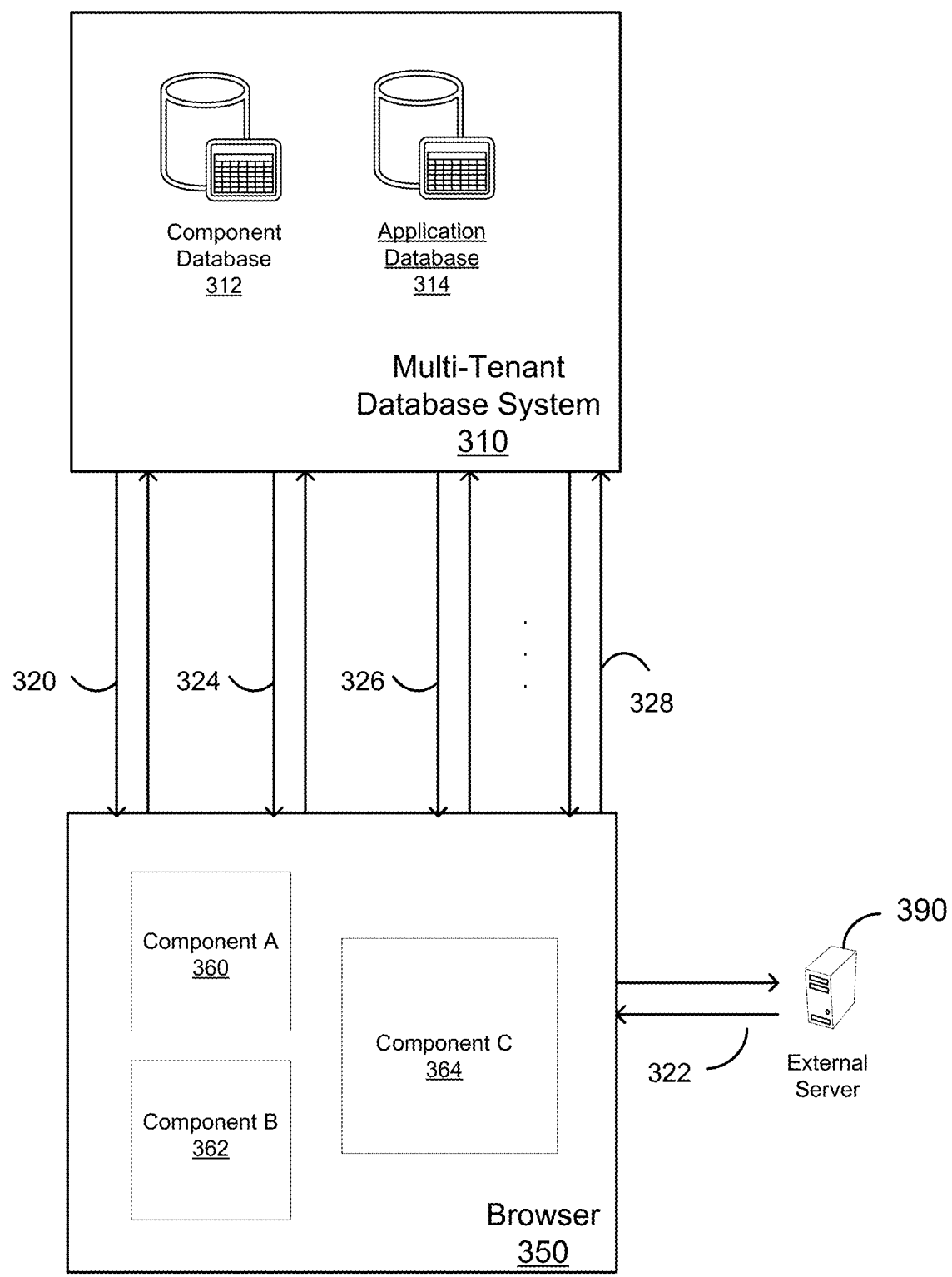
FIG. 3 shows a block diagram of an example for providing web application components at a remote site, performed in accordance with some implementations.

FIG. 3 shows a block diagram of an example for providing web application components at a remote site, performed in accordance with some implementations. Multi-tenant database system 310 includes a component database 310 and an application database 314. A browser 350 at a client device 108 is configured to display a remote site. The remote site contains script for requesting instances of three components from the component database 312, associated with a web application from the application database 314, at three different locations. The three components are illustrated as Component A 360, Component B 362, and Component C 364. An external server 390 hosts additional site elements to be included in the remote site. The external server 390 serves HTML, CSS, and JavaScript instructions for presenting the remote site at the browser 350. These instructions can be requested by the browser and sent from the external server through data request 322.

Data requests and responses are sent to and from the browser 350 and the multi-tenant database system 310 in the form of requests 320, 324, 326, and 328. More data requests and responses can be sent as needed within some implementations. Initially, a request 320 is sent for authentication of a user at the multi-tenant database system 310. Upon authentication, an access token containing a session ID is passed back to the browser 350. A request 324 is then sent from the browser 350 for a web application. The multi-tenant database system 350 determines whether the remote site is found on a CORS whitelist at the multi-tenant database system 350. If so, then data associated with the web application is sent to the remote site, including a bootstrapping document, a list of API definitions for running the web applications, and a list of resources the web application needs. A request 326 is then sent from the browser 350 for a component which the application requires. An instance of the component can be created at the remote site, such as Component A 360, at a specified region of the remote site. Additional component requests such as request 328 can be made, and additional instances of components can be deployed at the remote site on the browser 350, such as Component B 362 and Component C 364.

FIG. 4 shows an example of three lines of code 400 that can be served at a remote site to provide a web application and component from an external multi-tenant database system, in accordance with some implementations. Line 410 requests lightning.out.js from the multi-tenant database. Lightning.out.js is an example of JavaScript that begins the process of loading an application and its needed resources. Line 420 requests an application ("lotest") from the multi-tenant database, and passed an OAuth instance URL and access token to the multi-tenant database to verify that the session is authenticated. Line 430 requests an instance of a component "chatter" to be loaded in accordance with the application, at the location "chatterFeed".

Figure 5:
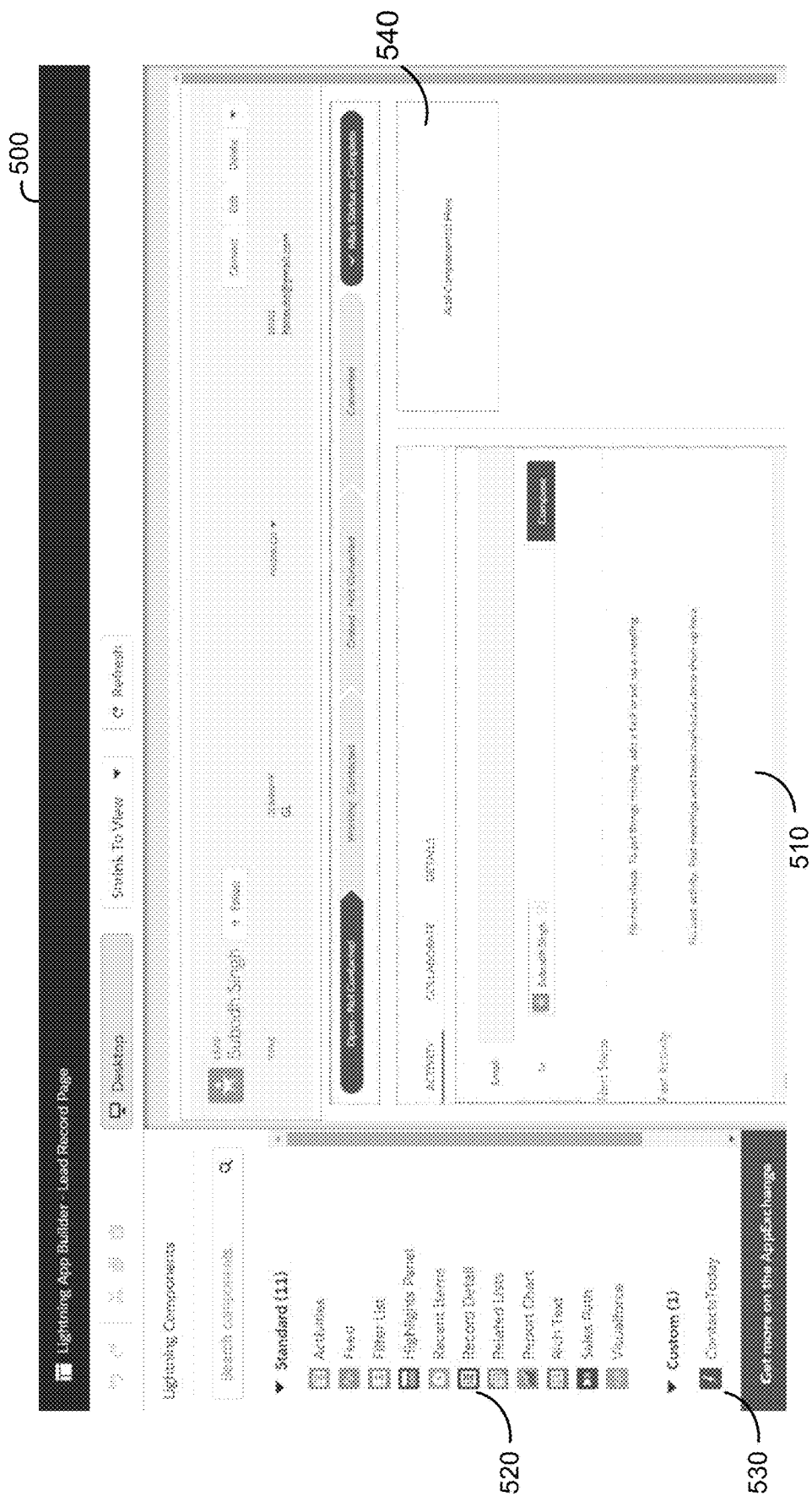
FIG. 5 shows an example of a graphical user interface (GUI) 500 for developing web applications that can be stored and retrieved from the multi-tenant database system by allowed remote sites, in accordance with some implementations.

FIG. 5 shows an example of a graphical user interface (GUI) 500 for developing web applications that can be stored and retrieved from the multi-tenant database system by allowed remote sites, in accordance with some implementations. Several standard components 520 are listed on a left side panel, as well as a custom component 530. A development space 510 allows an application to be composed as the product of multiple components. A component section 540 reads "Add Component(s) here." Standard components 520 or custom components 530 can be dragged to the component section 540 and dropped to be included within the application. In some implementations, custom components can be developed using the GUI 500 and added to applications. Such a GUI allows developers to create custom web applications and components to their specifications, and deploy the applications and components on remote sites quickly and efficiently.

FIG. 6 shows an example screenshot of a user interface 600 allowing a developer to add a remote site to a CORS whitelist maintained at a multi-tenant database system, according to some implementations. The Origin URL Pattern text field 610 allows a developer to enter the URL of a remote site to be whitelisted by the multi-tenant database system. Once a URL is entered, the developer may click a button 620 including "Save" or "Save & New" to submit the URL to be whitelisted. When the remote site requests a web application from the multi-tenant database, the multi-tenant database will determine that the remote site is whitelisted on the CORS whitelist, and will authorize application data to be sent to the browser.

Figure 7:
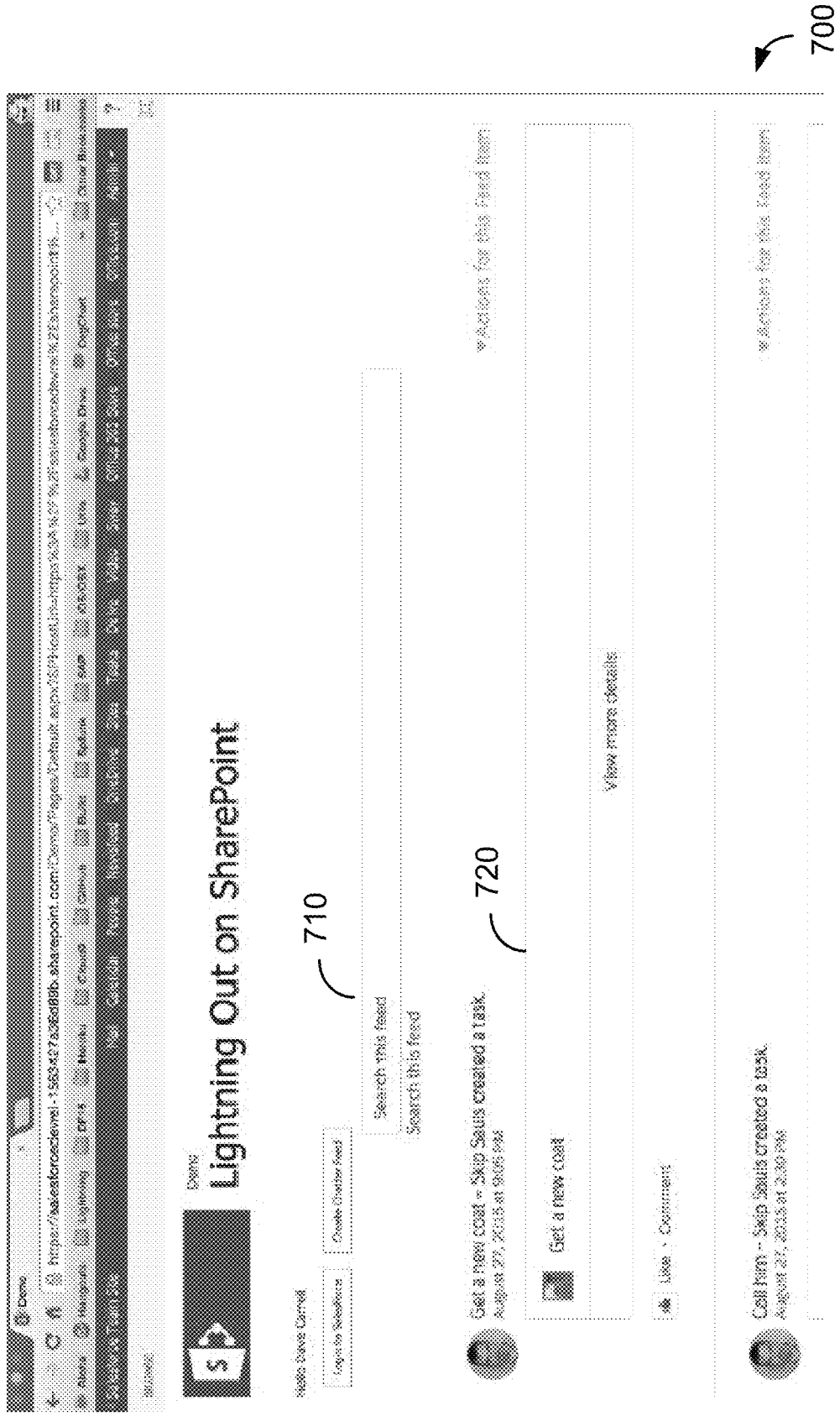
FIG. 7 shows an example screenshot of a browser window 700 serving a remote site with instances of external components included from a multi-tenant database system, in accordance with some implementations.

FIG. 7 shows an example screenshot of a browser window 700 serving a remote site with instances of external components included from a multi-tenant database system, in accordance with some implementations. This remote site is built with SharePoint. External web components from the multi-tenant database system need not understand the language of SharePoint, nor even be aware of the specifics of the containers of pages they are deployed within. In this sense, components may be deployed within pages running on SharePoint, Heroku, SAP, or any other web platform. In this example, a component 710 has been requested to provide a search bar for a chat feed component 720. The two components may not be aware of the details of each other, but nevertheless can operate together in the context of an application that utilizes both of them.

Systems, apparatus, and methods are described below for implementing database systems and enterprise level social and business information networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

By way of example, a user can update a record in the form of a CRM record, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed to the manager's feed page or other page.

Figure 8A:
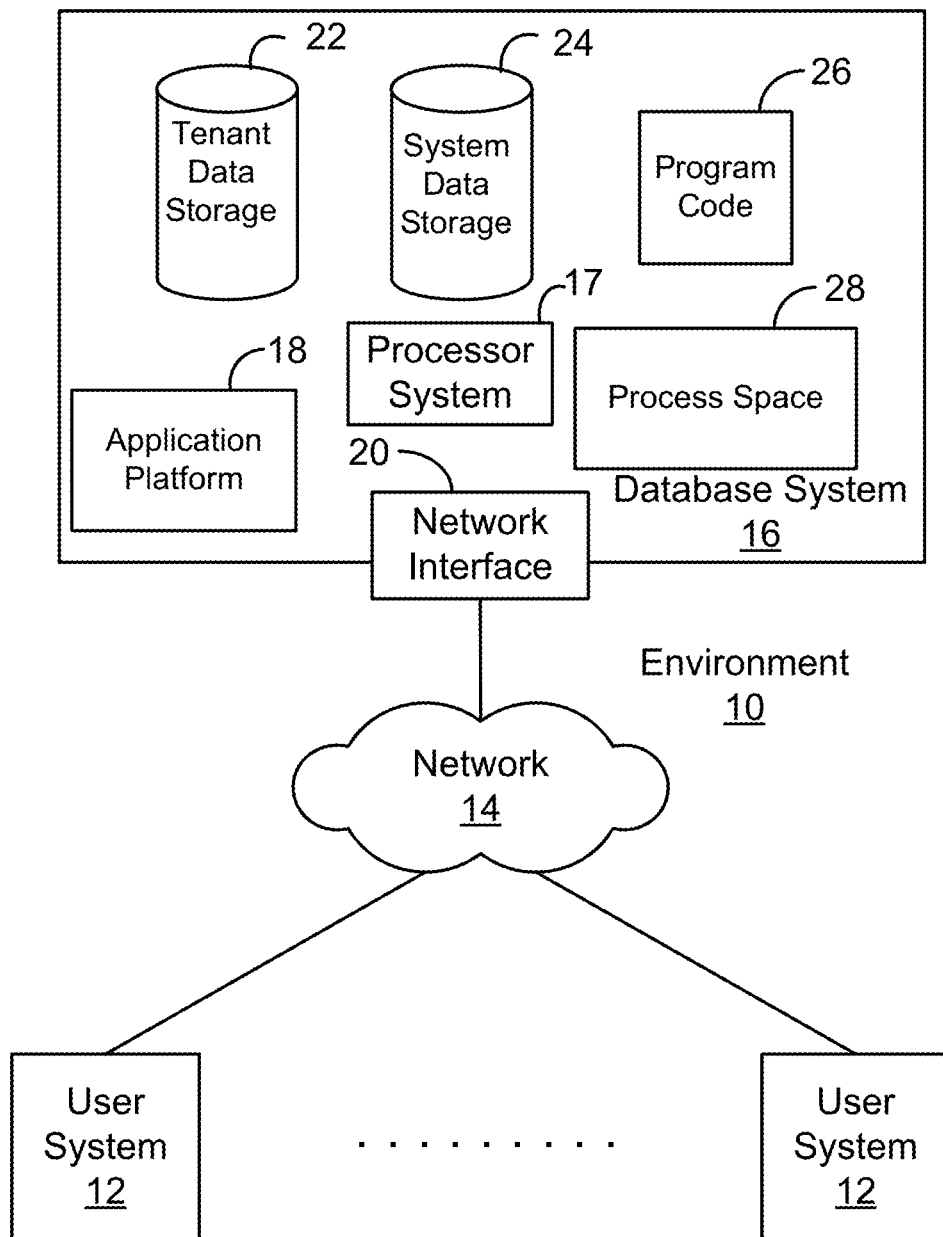
FIG. 8A shows a block diagram of an example of an environment 10 in which an on-demand database service can be used in accordance with some implementations.

FIG. 8A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 8A (and in more detail in FIG. 8B) user systems 12 might interact via a network 14 with an on-demand database service, which is implemented in the example of FIG. 8A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 8A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 8B:
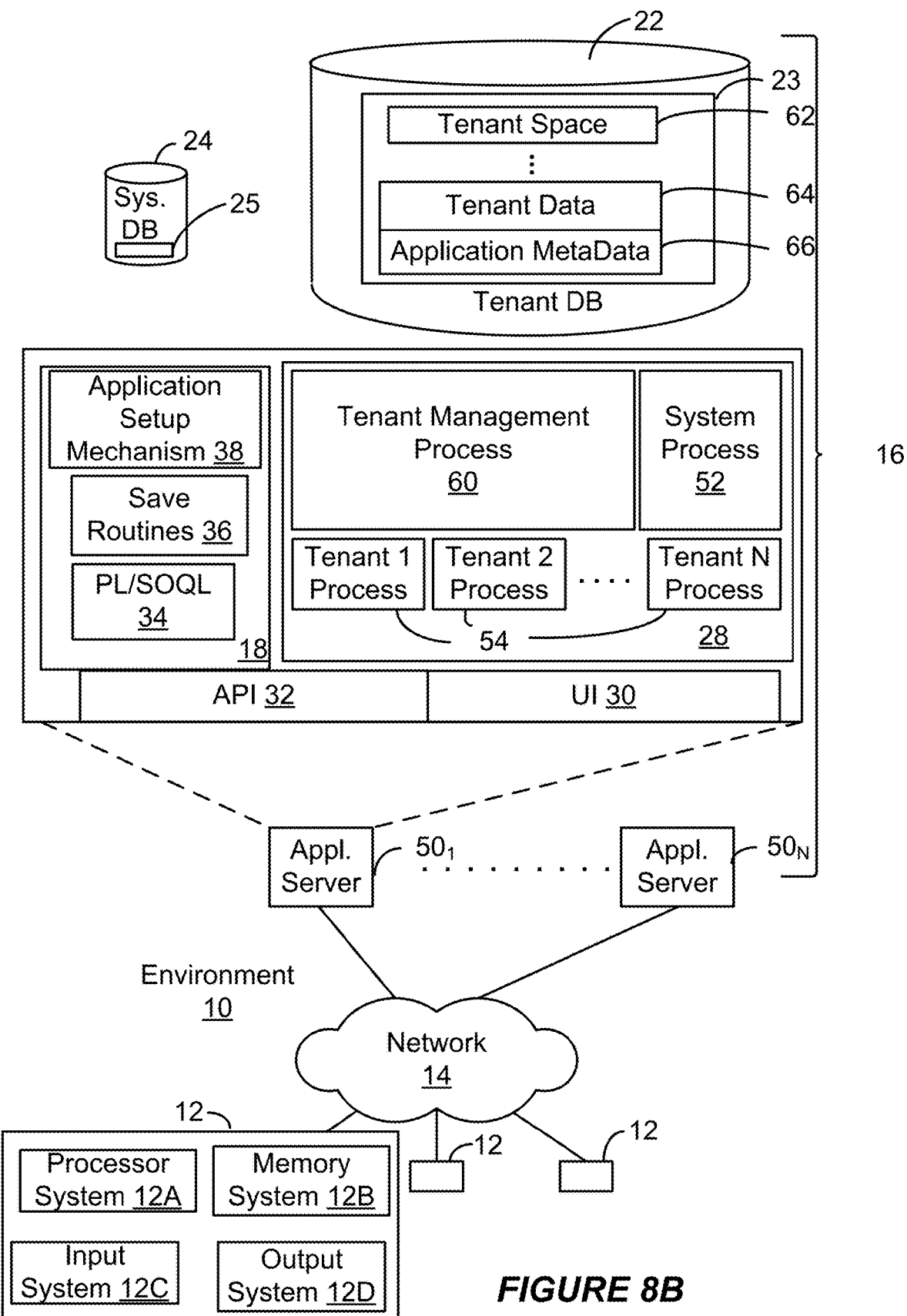
FIG. 8B shows a block diagram of an example of some implementations of elements of FIG. 8A and various possible interconnections between these elements.

One arrangement for elements of system 16 is shown in FIGS. 8A and 8B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 8A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 8B shows a block diagram of an example of some implementations of elements of FIG. 8A and various possible interconnections between these elements. That is, FIG. 8B also illustrates environment 10. However, in FIG. 8B elements of system 16 and various interconnections in some implementations are further illustrated. FIG. 8B shows that user system 12 may include processor system 12A, memory system 12B, input system 12C, and output system 12D. FIG. 8B shows network 14 and system 16. FIG. 8B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 8A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 8B, system 16 may include a network interface 20 (of FIG. 8A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 9A:
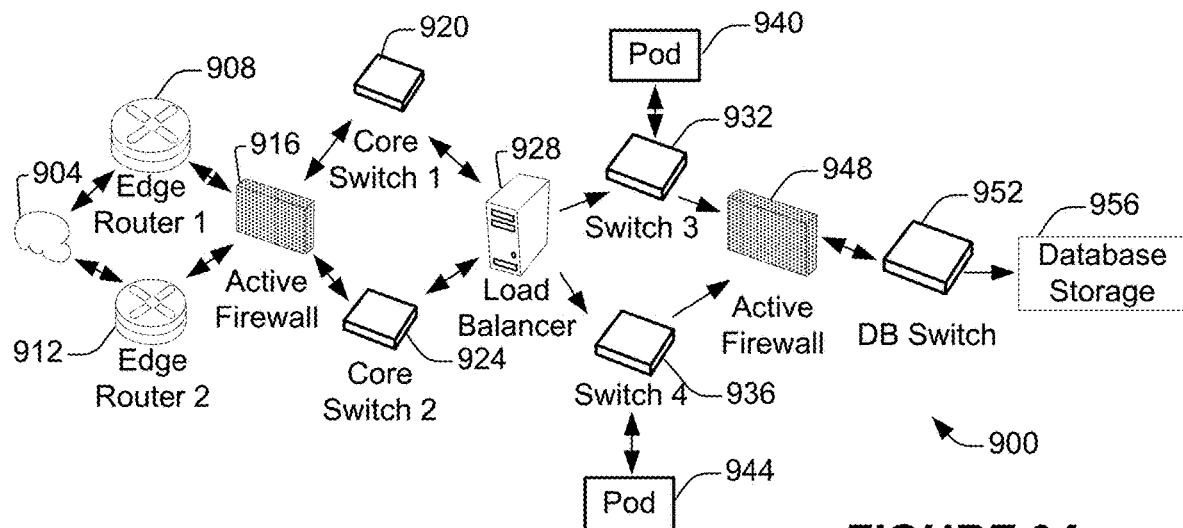
FIG. 9A shows a system diagram of an example of architectural components of an on-demand database service environment 900, in accordance with some implementations.

FIG. 9A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 9B:
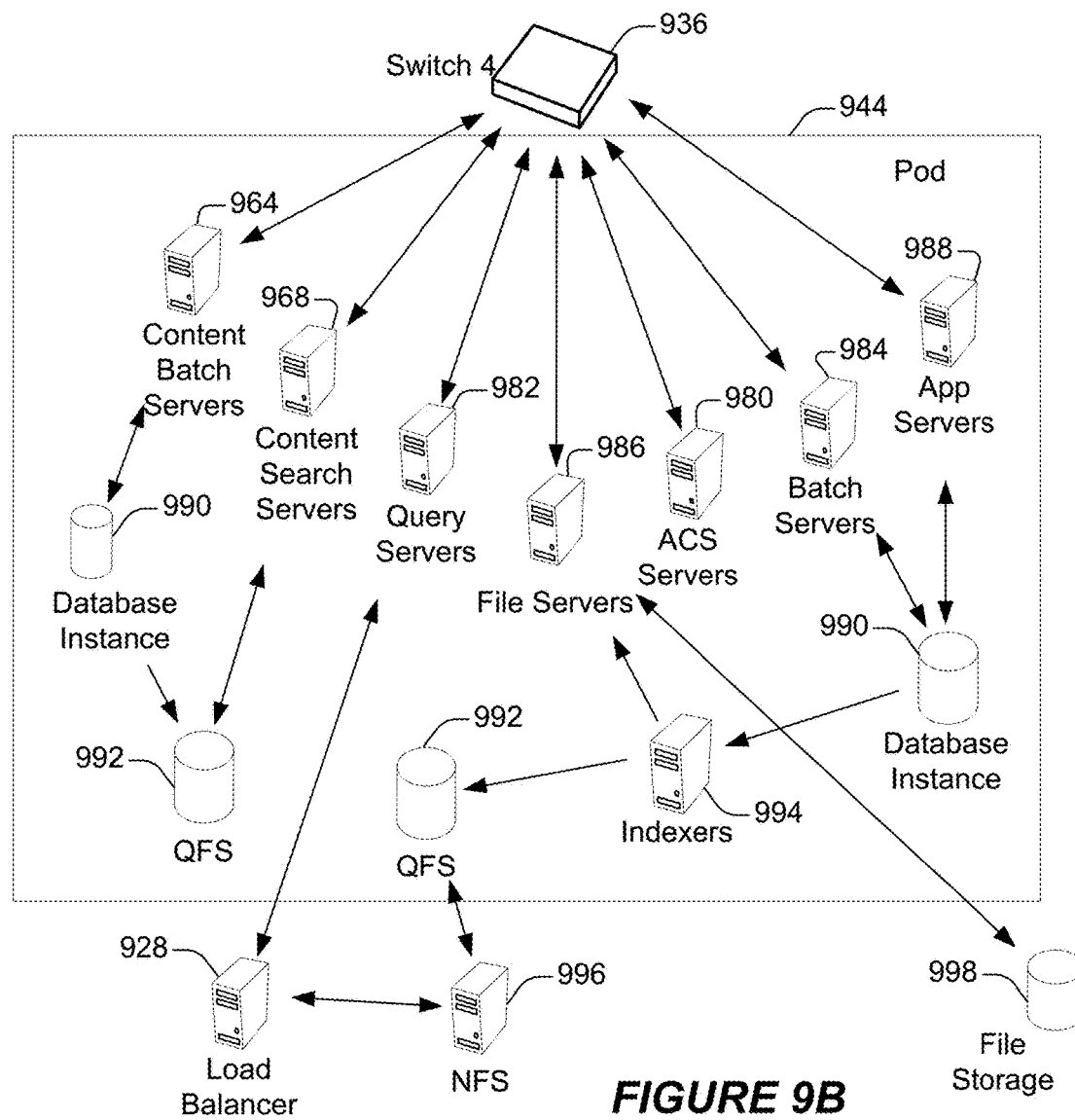
FIG. 9B shows a system diagram further illustrating an example of architectural components of an on-demand database service environment, in accordance with some implementations.

As shown in FIGS. 9A and 9B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 9A and 9B, some implementations of an on-demand database service environment may include anywhere from one to many devices of each type. Also, the on-demand database service environment need not include each device shown in FIGS. 9A and 9B, or may include additional devices not shown in FIGS. 9A and 9B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 9B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 9A and 9B.

FIG. 9B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988.

Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

Some but not all of the techniques described or referenced herein are implemented as part of or in conjunction with a social networking database system, also referred to herein as a social networking system or as a social network. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, CRM services and other database management services, any of which can be accessed and used in conjunction with the techniques disclosed herein in some implementations. These various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail herein.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described herein. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail herein, allows a user to track the progress of that record when the user is subscribed to the record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be social media messages submitted by a user or can otherwise be generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned herein, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail herein. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory ("ROM") devices and random access memory ("RAM") devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a multi-tenant database system implemented using a server system, the multi-tenant database system configurable to cause:
maintaining a component database storing component data objects identifying a plurality of components for web applications;
maintaining an application database different from the component database and storing application data objects identifying a plurality of web applications useable by developers, each of the plurality of web applications being dependent on one or more of the components;
processing a first request identifying one of the web applications for use at a remote site associated with a requesting developer, the first request received from a client machine;
determining, based on a list of allowed remote sites for the plurality of web applications and using a resource sharing object configured for selective addition of sites to the list of allowed remote sites for the plurality of web applications, that the remote site associated with the requesting developer is authorized by the multi-tenant database system with respect to the web application identified by the first request;
sending data associated with the web application identified by the first request to the remote site associated with the requesting developer;
processing a second request to provide a first one of the components for use at the remote site associated with the requesting developer, the second request received from the client machine, the second request indicating at least a first component location, the first component location indicating a first specified region of the remote site associated with the requesting developer;
authenticating, based on a session identifier (ID) in the second request, a communication session between the multi-tenant database system and the remote site associated with the requesting developer, the session ID identifying the communication session as an established session between the multi-tenant database system and the remote site; and
sending, responsive to authenticating the communication session, data associated with the first component to the remote site associated with the requesting developer, the data associated with the first component configurable to cause an instance of the first component to be included at the remote site associated with the requesting developer at the first component location.

2. The system of claim 1, the multi-tenant database system further configurable to cause:
determining, via an authorization protocol, that the client machine is authenticated at the multi-tenant database system; and
sending an access token to the client machine, the access token including the session identifier.

3. The system of claim 2, wherein the authorization protocol includes at least one of: OAuth, SAML, or OpenID.

4. The system of claim 2, wherein the session identifier is implemented as a unique session identification number.

5. The system of claim 1, wherein the determining that the remote site is authorized by the multi-tenant database system with respect to the web application is performed using Cross-Origin Resource Sharing (CORS).

6. The system of claim 1, wherein the second request to provide the first one of the components for use at the remote site further indicates one or more component parameters, the one or more component parameters associated with one or more records in the multi-tenant database system.

7. The system of claim 1, the multi-tenant database system further configurable to cause:
processing a third request to provide a second one of the components for use at the remote site, the third request received from the client machine, the third request indicating at least a second component location, the web application being associated with the second component, the second component location indicating a second specified region of the remote site; and
sending data associated with the second component to the remote site, the data configurable to cause an instance of the second component to be included at the remote site at the second component location.

8. The system of claim 1, wherein the data associated with the web application includes at least one of a list of resources associated with the web application and a list of definitions associated with the web application.

9. A method comprising:
maintaining, at a multi-tenant database system, a component database storing component data objects identifying a plurality of components for web applications;
maintaining, at a multi-tenant database system, an application database different from the component database and storing application data objects identifying a plurality of web applications useable by developers, each of the plurality of web applications being dependent on one or more of the components;
processing a first request identifying one of the web applications for use at a remote site associated with a requesting developer, the first request received from a client machine;
determining, based on a list of allowed remote sites for the plurality of web applications and using a resource sharing object configured for selective addition of sites to the list of allowed remote sites for the plurality of web applications, that the remote site associated with the requesting developer is authorized by the multi-tenant database system with respect to the web application identified by the first request;
sending data associated with the web application identified by the first request to the remote site associated with the requesting developer;
processing a second request to provide a first one of the components for use at the remote site associated with the requesting developer, the second request received from the client machine, the second request indicating at least a first component location, the first component location indicating a first specified region of the remote site associated with the requesting developer;

authenticating, based on a session identifier (ID) in the second request, a communication session between the multi-tenant database system and the remote site associated with the requesting developer, the session ID identifying the communication session as an established session between the multi-tenant database system and the remote site; and sending, responsive to authenticating the communication session, data associated with the first component to the remote site associated with the requesting developer, the data associated with the first component configurable to cause an instance of the first component to be included at the remote site associated with the requesting developer at the first component location.

10. The method of claim 9, further comprising:

determining, via an authorization protocol, that the client machine is authenticated at the multi-tenant database system; and sending an access token to the client machine, the access token including the session identifier.

11. The method of claim 10, wherein the authorization protocol includes at least one of: OAuth, SAML, or OpenID.

12. The method of claim 9, wherein the determining that the remote site is authorized by the multi-tenant database system with respect to the web application is performed using Cross-Origin Resource Sharing (CORS).

13. The method of claim 9, wherein the second request to provide the first one of the components for use at the remote site further indicates one or more component parameters, the one or more component parameters associated with one or more records in the multi-tenant database system.

14. The method of claim 9, further comprising:

processing a third request to provide a second one of the components for use at the remote site, the third request received from the client machine, the third request indicating at least a second component location, the web application being associated with the second component, the second component location indicating a second specified region of the remote site;

sending data associated with the second component to the remote site, the data configurable to cause an instance of the second component to be included at the remote site at the second component location.

15. The method of claim 9, wherein the data associated with the web application includes at least one of a list of resources associated with the web application and a list of definitions associated with the web application.

16. A computer program product comprising computer-readable program code capable of being executed by one or more processors when retrieved from a non-transitory computer-readable medium, the program code comprising instructions configurable to cause:

maintaining, at a multi-tenant database system, a component database storing component data objects identifying a plurality of components for web applications;

maintaining, at a multi-tenant database system, an application database different from the component database and storing application data objects identifying a plurality of web applications useable by developers, each of the plurality of web applications being dependent on one or more of the components;

processing a first request identifying one of the web applications for use at a remote site associated with a requesting developer, the first request received from a client machine;

determining, based on a list of allowed remote sites for the plurality of web applications and using a resource sharing object configured for selective addition of sites to the list of allowed remote sites for the plurality of web applications, that the remote site associated with the requesting developer is authorized by the multi-tenant database system with respect to the web application identified by the first request;

sending data associated with the web application identified by the first request to the remote site associated with the requesting developer;

processing a second request to provide a first one of the components for use at the remote site associated with the requesting developer, the second request received from the client machine, the second request indicating at least a first component location, the first component location indicating a first specified region of the remote site associated with the requesting developer;

authenticating, based on a session identifier (ID) in the second request, a communication session between the multi-tenant database system and the remote site associated with the requesting developer, the session ID identifying the communication session as an established session between the multi-tenant database system and the remote site; and sending data associated with the first component to the remote site associated with the requesting developer, the data associated with the first component configurable to cause an instance of the first component to be included at the remote site associated with the requesting developer at the first component location.

17. The computer program product of claim 16, the program code comprising instructions further configurable to cause:

determining, via an authorization protocol, that the client machine is authenticated at the multi-tenant database system; and sending an access token to the client machine, the access token including the session identifier.

18. The computer program product of claim 17, wherein the authorization protocol includes at least one of: OAuth, SAML, and OpenD.

19. The computer program product of claim 16, wherein the determining that the remote site is authorized by the multi-tenant database system with respect to the web application is performed using Cross-Origin Resource Sharing (CORS).

20. The computer program product of claim 16, wherein the second request to provide the first one of the components for use at the remote site further indicates one or more component parameters, the one or more component parameters associated with one or more records in the multi-tenant database system.

* * * * *